Oct. 27, 1942.     A. G. LADRACH     2,299,997
PRECISION MEASURING DEVICE
Filed June 12, 1940     2 Sheets-Sheet 1

INVENTOR.
Aaron G. Ladrach
BY
J Ralph Barron

Oct. 27, 1942.   A. G. LADRACH   2,299,997
PRECISION MEASURING DEVICE
Filed June 12, 1940    2 Sheets-Sheet 2
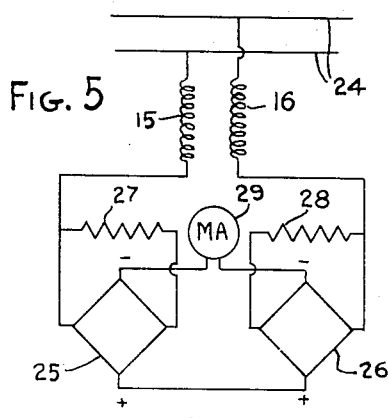
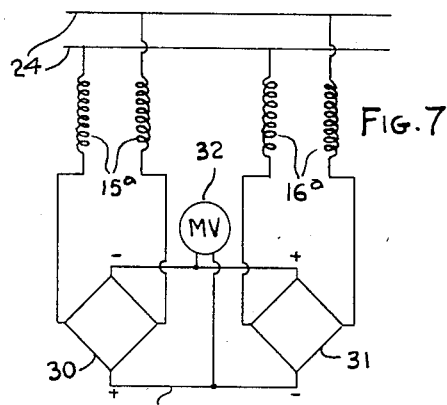
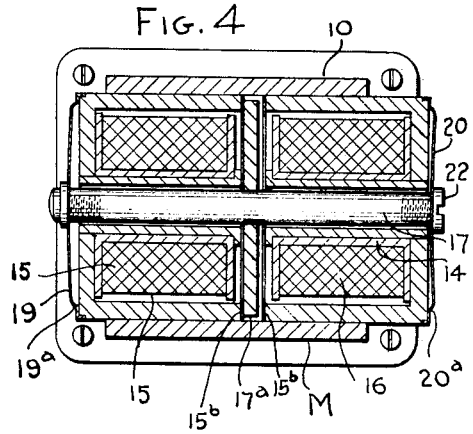
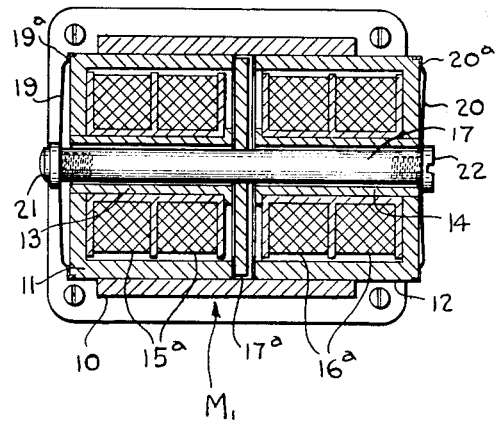
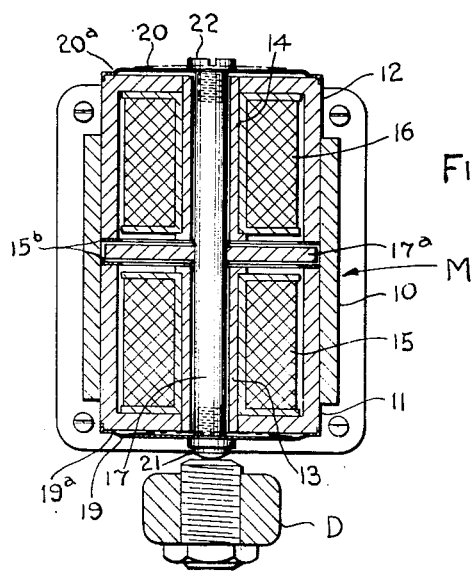
INVENTOR.
Aaron G. Ladrach
BY
Ralph Barrow Patented Oct. 27, 1942

2,299,997

UNITED STATES PATENT OFFICE 2,299,997

PRECISION MEASURING DEVICE

Aaron G. Ladrach, Portage Lakes, Ohio

Application June 12, 1940, Serial No. 340,087

12 Claims. (Cl. 33—148)

This invention relates to precision measuring devices for use in thickness gauges, weighing scales, etc., as for example, for continuously indicating, recording, or otherwise manifesting variations in measurement of continuous strips or sheets of material.

A purpose of the invention is to provide a device of the character described, utilizing spaced inductance coils with a shiftable armature between the same, means being provided for mounting said armature to be shiftable relatively of the coils with a minimum of friction, whereby maximum efficiency and accuracy is obtained in the device.

Another object of the invention is to provide an improved measuring devices of the type described in the last paragraph, having a balanced circuit supplying sufficient voltage to operate a pen on a recorder.

Other objects of the invention will be manifest from the following brief description and the accompanying drawings.

Of the accompanying drawings:

Figure 3 is a cross-section taken on line 3—3 of Figure 2, illustrating the measuring unit with the relatively movable parts thereof in normal operative condition.

Figure 4 is a similar cross-section through the measuring unit, but with the relatively movable parts shown in normal inoperative condition.

Figure 5 is a schematic wiring diagram of the electrical connections to the device.

Figure 6 is a view similar to Figure 4, illustrating a modified form of measuring unit.

Figure 7 is a view similar to Figure 5 showing electrical connections used with the unit shown in Figure 6.

The present invention is adapted to be incorporated in many types of gauging or measuring equipment of known construction. For example, in Patent No. 2,122,818 in the name of the present inventor, there is shown continuous gauging apparatus embodying a light-sensitive unit for manifesting variations in measurement of continuous strip material. For the purposes of illustration the present improved measuring device, operating on an electro-magnetic principle, may be substituted for the light-sensitive measuring unit disclosed in said patent.

Figure 1:
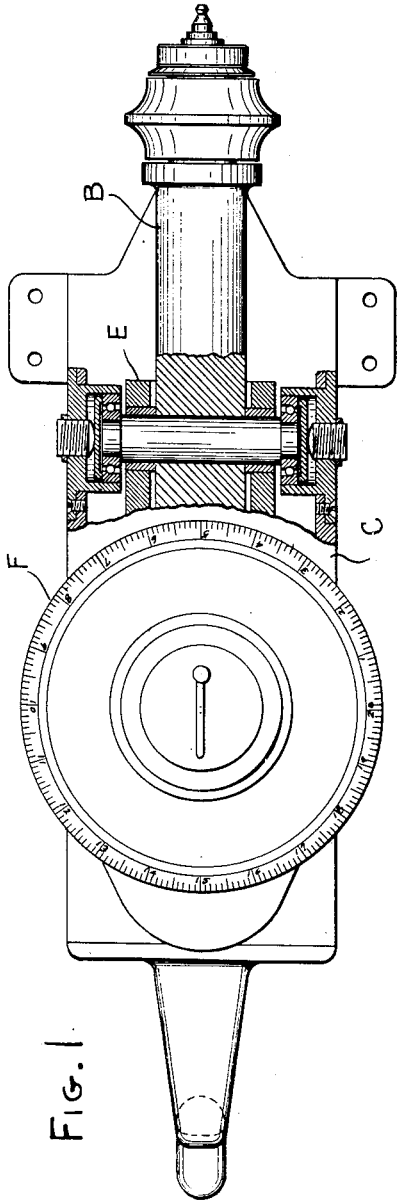
Figure 1 is a plan view, partly broken away and in section, of a continuous gauge embodying the invention.
Figure 2:
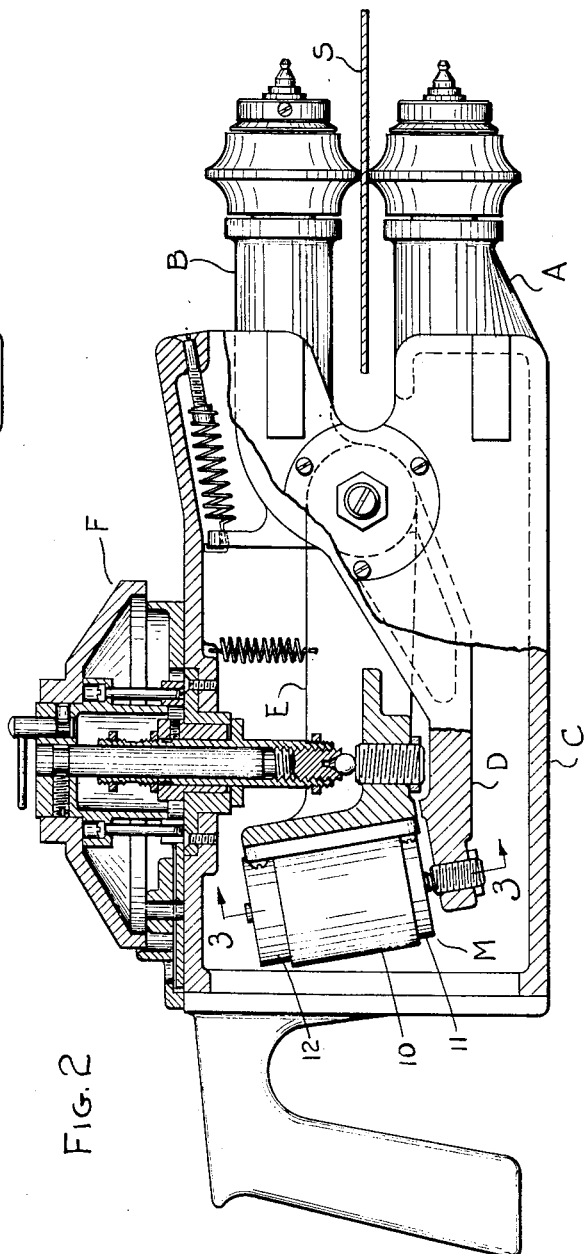
Figure 2 is a front elevation thereof, partly broken away and in section.

Substantially as shown in the above-mentioned patent, Figures 1 and 2 of the drawings illustrate a continuous gauging device comprising a relatively fixed arm A, and an arm B pivoted in a housing C to move an integral, inwardly extending lever D relatively of an electromagnetic measuring device M embodying the present invention. The device M is carried by a yoke E mounted on the same pivot with arm B, said yoke being yieldingly and adjustably held in relatively fixed position, as shown, and the adjustments being made by means of a vernier mechanism F in the manner described in said patent. The outer ends of the arms A and B may have suitable contact rollers thereon, between which, for example, a continuous sheet of material S to be gauged is passed as it issues from a mill.

The construction of the measuring unit M is best shown in Figures 2, 3 and 4. Mounted on yoke E may be a cylindrical casing 10 of non-magnetic material within which is secured by any suitable means, cup-shaped holders 11, 12 of electro-magnetic material, said holders having the open ends thereof facing each other in spaced relation. Secured in the closed ends of the holders may be inwardly extending central sleeves 13, 14 having oppositely wound electromagnetic coils 15, 16 thereon. Received through said sleeves in loose, non-contacting relation, may be an armature shaft 17 of substantially non-magnetic material, such as brass, said shaft being supported in a manner to be described so as to be longitudinally shiftable by swinging movement of the lever D against yielding action of a spring 18 connected between arm B and the housing C, and such movement being caused by variations in thickness of the sheet material S passing between the contacting rollers on arms A and B. Fixed on the shaft 17 may be disclike armature 17ª, arranged intermediate the open ends of holders 11, 12, with suitable clearance to provide for axial movement thereof, upon movement of the shaft as described. Additional clearance may be provided for insertion of fibre or like rings 15ᵇ on each side of the armature to prevent chattering when the armature is moved.

It is very desirable to support the armature shaft 17 so as to be shiftable along its axis without substantial friction, to obtain maximum operating efficiency and accuracy in the measuring device. To this end, the shaft 17 is secured at opposite ends thereof to flexible, resilient diaphragms or discs 19, 20 of substantially non-magnetic material, by means of cap screws 21, 22 threaded in the ends of the shaft, these diaphragms having off-set flanged portions 19ª, 20ª for securing the same on the outer ends of the holders 11, 12. The off-set portions maintain the diaphragms in spaced relation to the closed ends of the holders, as shown, to permit free flexing of the diaphragms as shaft 17 is axially shifted.

The diaphragms 19, 20 as originally formed preferably are of concavo-convex shape, and are applied on the outer ends of the holders 11, 12 so that both will curve or bulge in the same direction, as shown in Figure 4, assuming for this purpose that lever D is not in engagement with the set screw in the lower end of armature shaft 17 (see Figure 2). By virtue of the resiliency of the diaphragms they will always have a tendency to resume this normal bowed condition. Thus when the unit is adjusted to center the armature 17ª between the holders 11, 12, as shown in Figure 3, the diaphrgms will be yieldingly flexed to relatively flat condition (see full lines in Figure 3). This last-named adjustment may be made by means of the vernier mechanism F, as will be understood by those skilled in the art.

Referring to Figure 5, the coils 15, 16 may have ends connected across a suitable source of alternating current, such as power lines 24, the other ends of the coils connecting in a Wheatstone bridge or balanced circuit, through suitable rectifiers 25, 26 and shunt resistances 27, 28 substantially as shown. Differences in potential in the two coils of the normally balanced circuit, caused by axial movement of armature 17ª between the coils, will be indicated on a galvanometer 29, such as a milliameter calibrated to plus and minus distances on either side of zero position, the same being connected between the rectifiers 25, 26 as shown.

In use of the unit for continuous gauging of sheet material S, the vernier mechanism F may be calibrated to correspond to the desired thickness of the material, in which case the armature 17ª will be centered between the coils 15, 16 (see Figure 3), and the electrical circuit, shown in Figure 5, will be in balanced condition with a zero reading on the galvanometer 29. Should the material S be under gauge, lever D will move armature shaft 17 upwardly against the yielding action of the diaphragms, which tend to resume the normal concavo-convex shapes thereof shown in Figure 4. This moves the armature toward upper coil 16 and away from coil 15 to unbalance the circuit, the resultant difference in potential being manifested by a corresponding under-gauge reading on the milliameter 29. Should the material S be over gauge lever D will permit the armature shaft to move downwardly, as urged by diaphragms 19, 20, tending to resume normal bulged shape (Figure 4), the armature thereby being moved a corresponding amount away from coil 16 and toward coil 15, to unbalance the circuit in the opposite direction, whereby the milliameter will indicate the amount of over gauge. The diaphragms effectively support shaft 17 to permit free axial movement thereof without substantial friction between the relatively movable parts. Thus, it will readily be seen that the measuring device will operate with maximum efficiency and accuracy.

One difficulty in gauges heretofore used is that oil and moisture find their way into the armature bearing and so clog and bind the armature as to increase the friction and restrict free movement thereof, destroying the accuracy of the gauge. The diaphragms not only mount the armature effectively for free frictionless movement but seal the armature against ingress of moisture and oil resulting in corrosion and freezing so that the present gauge gives accurate trouble-proof service over a long period of time under adverse conditions such as frequently met in industrial plants such as steel mills.

Referring to Figure 6, there is shown a modified form of measuring unit $M_1$, which may be used in place of the unit M when it is desired to record continuously the variations in thickness of material S. In such case, single coils 15 and 16, as previously described, may not produce sufficient voltage to operate the recorder. To this end, in place of single coils there may be mounted double coils 15ª, 15ª and 16ª, 16ª on each side of armature 17, all other parts in unit $M_1$ being similar to unit M, and therefore being given like numerals. The double coils may be connected in a balancing circuit, somewhat as shown in Figure 7. In this circuit the pairs of coils 15ª and 16ª are connected in parallel from a source of electrical current to rectifiers 30 and 31, respectively, the rectifiers being connected in series in a rectifier circuit R. The two coils in each pair are in series with the rectifier to which they are connected. A recording voltmeter 32 may be connected in parallel in the rectifier circuit, between the rectifiers, as shown.

It has been found that with the same input the output for the rectifiers in the case of the double-coil arrangement, shown in Figure 7, is increased many-fold over the single coil arrangement of Figure 5, and thus there is sufficient power output with the circuit of Figure 7 effectively to operate a direct reading recorder pen. The circuit of Figure 7 may be referred to as a differential rectifier circuit.

Modifications of the invention may be resorted to without departing from the spirit thereof or the scope of the appended claims.

What is claimed is:

1. A device of the class described comprising a member shiftable in response to variations in distance, an element shiftable by said member and having an armature thereon, oppositely arranged electro-magnetic coils, means for mounting relatively fixedly said coils to be spaced on opposite sides of said armature, means independently of the armature for supplying a current of electricity to said coils, and means for shiftably mounting said element comprising spaced diaphragms of flexible material between which said element is supported.

2. A device of the class described comprising a member shiftable in response to variations in distance, an element shiftable by said member and having an armature thereon, oppositely arranged electro-magnetic coils, means independent of said armature for supplying a current of electricity to said coils, means for relatively fixedly mounting said coils to be axially spaced on opposite sides of said armature and for enclosing the same, and means for mounting said element to be freely shiftable axially through said coils, said mounting means comprising spaced diaphragms of flexible material sealing said coils and armature in said mounting and enclosing means.

3. A device for measuring variable distances comprising a distance gauging member, an element shiftable thereby in response to distance variations of said member and having an armature thereon, oppositely arranged electro-magnetic coils, means independently of the armature for supplying an electrical current to said coils, means for mounting said coils in fixed relation to be axially spaced on opposite sides of said armature and through which the element extends, and means for mounting said element comprising spaced diaphragms of flexible resilient material.

4. A device of the class described comprising a member shiftable in response to variations in distance, an element shiftable by said member and having an armature thereon, oppositely arranged electro-magnetic coils, means independently of said armature for supplying an electrical current to said coils, means for relatively fixedly mounting said coils to be spaced on opposite sides of said armature, said element extending through said coils and means for shiftably mounting said element, comprising spaced concavo-convex diaphragms of flexible material.

5. A device of the class described comprising a member shiftable in response to variations in distance, an element shiftable by said member and having an armature thereon, oppositely arranged electro-magnetic coils, means for relatively fixedly mounting said coils to be axially spaced on opposite sides of said armature, and means for mounting said element to be freely shiftable axially through said coils, said mounting means comprising spaced concavo-convex diaphragms of flexible material between which said element is secured.

6. A device for measuring variable distances comprising a distance-gauging member, an element shiftable along a longitudinal axis by said member in response to distance variations thereof, said element having an armature fixedly mounted thereon, relatively fixed electro-magnetic means associated with said armature, and means for axially shiftably mounting said element comprising axially spaced concavo-convex diaphragms of flexible resilient material between which said element is supported.

7. A device for measuring variable distances comprising a distance gauging member, an element shiftable thereby in response to distance variations and having an armature thereon, opposed electro-magnetic coils, means for relatively fixedly mounting said coils in axially spaced relation on opposite sides of said armature, and means for mounting said element to be freely axially shiftable through said coils, said element mounting means comprising axially spaced concavo-convex diaphragms of flexible resilient material secured on said coil mounting means, said diaphragms being yieldingly flexible in parallelism against the resiliency thereof.

8. A device for measuring variable distances comprising a distance gauging member, an armature shiftable thereby in response to distance variations, oppositely arranged electro-magnetic means arranged in spaced relation with said armature normally centrally therebetween, said electro-magnetic means each including a plurality of coils and connected in parallelism with a current source, a balancing circuit connecting said electro-magnetic means, said circuit being unbalanced by changes in potential between said electro-magnetic means upon movement of said armature from its central position, and means in said circuit for manifesting variations in electrical potential between said electro-magnetic means upon movement of said armature, said balancing circuit comprising a plurality of rectifiers each connected to one of said magnetic means and to each other.

9. A device for measuring variable distances comprising a distance gauging member, an element shiftable thereby in response to distance variations and having an armature thereon, means for mounting said element comprising spaced diaphragms of flexible resilient material, oppositely arranged electro-magnetic means arranged in spaced relation with said armature normally centrally therebetween, each of said electro-magnetic means including a plurality of coils and said electro-magnetic means being connected in parallelism with a current source, a balancing circuit connecting said electro-magnetic means, said circuit being unbalanced by changes in potential between said electro-magnetic means upon movement of said armature from its central position, and means for manifesting variations in potential between said electro-magnetic means upon movement of said armature, said diaphragms being of concavo-convex formation.

10. An electrical circuit comprising a shiftable armature, opposed electro-magnetic means arranged in spaced relation with said armature therebetween, a pair of rectifiers connected in a rectifier circuit, a source of alternating current, said electro-magnetic means each including a pair of coils, the pairs of coils being connected in parallel with said current source and one of said pairs to each of said rectifiers in series, and means connected in parallel across said rectifier circuit for manifesting variations in electrical potential between said electro-magnetic means upon movement of said armature.

11. A device for measuring variable distances comprising a distance gauging member, an armature shiftable in response to distance variations of said gauging member, opposed electro-magnetic means arranged in spaced relation with said armature therebetween, a pair of rectifiers connected in a rectifier circuit, a source of alternating current, said electro-magnetic means each including a pair of coils connected in parallel between said current source and one of said rectifiers, and means connnected in parallel across said rectifier circuit for manifesting variations in electrical potential between said electro-magnetic means upon movement of said armature.

12. A device for measuring variable distances comprising a distance-gauging member, an element shiftable thereby in response to distance variations of said member and having an armature thereon, relatively fixed electro-magnetic means associated with said armature, means for containing said electro-magnetic means and in which said element is shiftable, and means on said containing means for shiftably mounting said element to be shiftable relative to said electro-magnetic means, said mounting means comprising spaced diaphragms of flexible resilient material and sealing said electro-magnetic means and said element in said containing means.

AARON G. LADRACH.